United States Patent
Bogdanski et al.

[11] Patent Number: 6,150,636
[45] Date of Patent: Nov. 21, 2000

[54] CONTACT HEAT-TRANSFERRING COOKING SYSTEM WITH AN ELECTRIC HOTPLATE

[75] Inventors: Franz Bogdanski, Oberderdingen; Lutz Ose, Sternenfels, both of Germany

[73] Assignee: E.G.O. Elektro-Geraetebau GmbH, Germany

[21] Appl. No.: 09/005,631

[22] Filed: Jan. 9, 1998

[30] Foreign Application Priority Data

| Jan. 10, 1997 | [DE] | Germany | 197 00 552 |
| Jan. 18, 1997 | [DE] | Germany | 197 01 640 |
| Feb. 18, 1997 | [DE] | Germany | 297 02 813 U |

[51] Int. Cl.$^7$ ............................................. H05B 3/68
[52] U.S. Cl. .................................. 219/461.1; 219/443.1
[58] Field of Search ........................... 219/443.1, 446.1, 219/448.11, 460.1, 461.1, 467.1, 465.1, 466.1, 468.2, 543, 544, 546

[56] References Cited

U.S. PATENT DOCUMENTS

| 3,157,522 | 11/1964 | Stookey | 501/7 |
| 3,406,279 | 10/1968 | Ziver . | |
| 4,394,564 | 7/1983 | Dills . | |
| 4,527,050 | 7/1985 | Kicherer | 219/448.17 |
| 4,960,978 | 10/1990 | Lorenz et al. | 219/455 |
| 5,219,800 | 6/1993 | Kelso et al. | 501/32 |
| 5,396,047 | 3/1995 | Schilling et al. | 219/484.11 |
| 5,486,683 | 1/1996 | Shimizu et al. . | |
| 5,679,273 | 10/1997 | Petetin | 219/452.12 |

FOREIGN PATENT DOCUMENTS

| 0 231 529 | 8/1987 | European Pat. Off. . |
| 0 381 792 | 8/1990 | European Pat. Off. . |
| 0 453 313 | 10/1991 | European Pat. Off. . |
| 2 104 677 | 8/1972 | Germany . |
| 27 34 252 | 9/1978 | Germany . |
| 30 35 597 A1 | 4/1982 | Germany . |
| 34 04 214 A1 | 8/1983 | Germany . |
| 35 14 763 | 10/1986 | Germany . |
| 35 45 267 | 6/1987 | Germany . |
| 36 37 344 | 5/1988 | Germany . |
| 37 28 466 | 3/1989 | Germany . |
| 37 28 466 A1 | 3/1989 | Germany . |
| 41 00 767 | 7/1992 | Germany . |
| 41 30 337 | 3/1993 | Germany . |
| 43 17 040 | 4/1994 | Germany . |
| 195 10 989 | 10/1995 | Germany . |
| 196 17 319 | 10/1997 | Germany . |
| 95/163230 | 6/1995 | WIPO . |
| WO96/09738 | 3/1996 | WIPO . |
| 96/21384 A1 | 7/1996 | WIPO . |

*Primary Examiner*—Sang Paik
*Attorney, Agent, or Firm*—Quarles & Brady LLP

[57] ABSTRACT

A contact heat-transferring electric hotplate (11) is provided, which is made from nonoxidic ceramic, particularly silicon nitride. Its very thin hotplate body (14) in the form of a disk is installed in self-supporting manner in a hob plate, e.g. by bonding, and has an extremely flat surface or which is adapted to the cooking vessel shape, which creates such a small gap with respect to said vessel that a coupling is possible even with higher power densities with only a temperature difference of a few degrees. The heating means (17) is also in contact with or directly connected to the underside of the hotplate body (14).

64 Claims, 10 Drawing Sheets

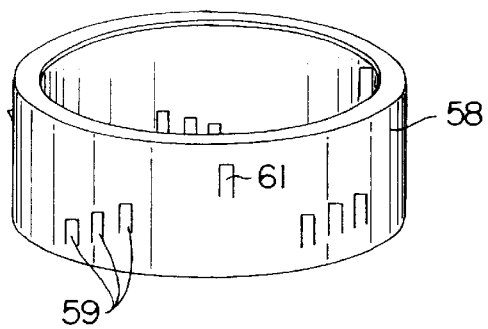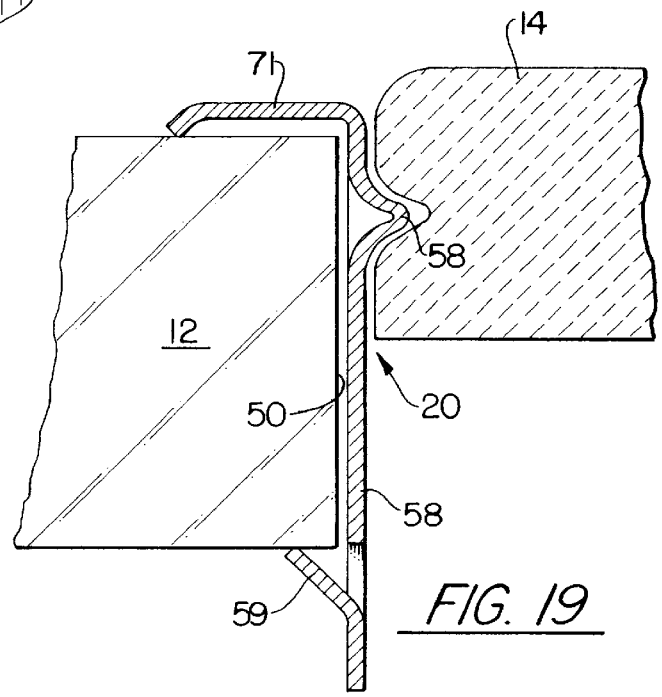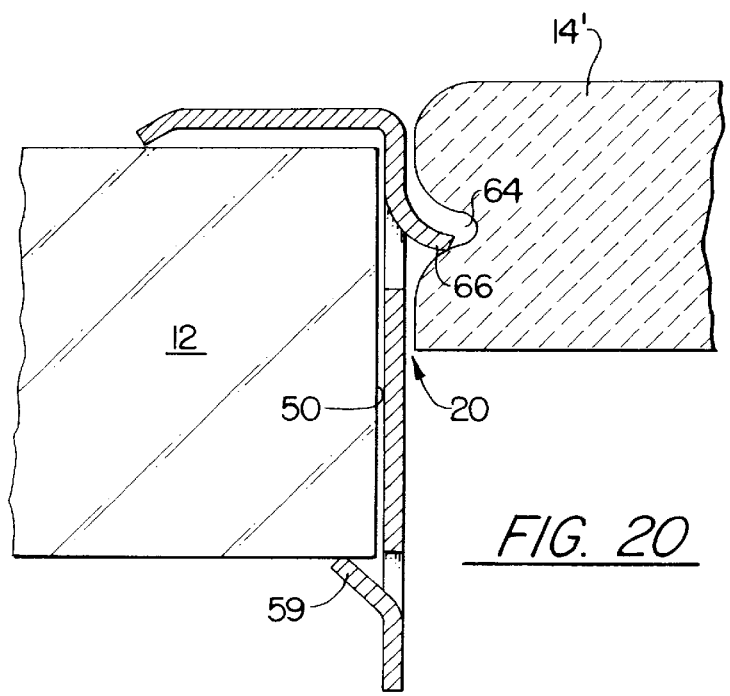

CONTACT HEAT-TRANSFERRING COOKING SYSTEM WITH AN ELECTRIC HOTPLATE

FIELD OF APPLICATION AND PRIOR ART

At present three cooking system types are known, which heat a cooking vessel standing on a plate essentially from below. These involve cast iron hotplates, which transfer the heat mainly by thermal contact to the cooking vessels, radiant heating cooking implements, in which the radiant heater members are placed below a glass ceramic plate, and induction hotplates, which transfer the energy into the bottom of the saucepan through induction fields. Cast hotplates have proved satisfactory for more than half a century and are virtually without compare as regards robustness, reliability and versatility of control. However, due to their material they have relatively long heating up periods, resulting, if only the heating up operation is considered, in lower efficiencies than radiant heaters and induction-based systems.

Contact-based electric hotplates made from ceramic material have already been proposed, which are better than cast hotplates with regards to the heating up times and efficiency. However, they have not as yet acquired practical application. Thus, DE-A-37 28 466 (=U.S. Pat. No. 4,960, 978) discloses an electric hotplate with a hotplate body made from metal or ceramics such as silicon nitride and heated by means of a thick-film resistor.

OBJECT AND SOLUTION

An object of the invention is to provide a contact heat-transferring or transmitting cooking system with electric hotplates, which is better than the hitherto known cooking systems as regards efficiency, controllability and regulatability.

SUMMARY OF THE INVENTION

If, according to the invention, the hotplate is so flat or planar that it diverges by less than 0.1 mm from an ideal plane over most of its cooking area in a temperature range between room temperature and approximately 500K, i.e. in the hotplate operating temperature range, then it is also possible to work with such flat or planar cooking vessels. If such a flatness cannot be respected either for the cooking vessels or for the electric hotplate, then the cooperating surfaces are e.g. uniformly cambered, but respect the same conditions regarding their maximum reciprocal spacing. In fact, during heating they could undergo deformation, but both would deform in the same direction and to the same extent, so that e.g. spherical or spherical segmental surfaces conform.

As a result of these measures an extremely good heat transfer is ensured. As a result the temperature difference between the hotplate surface and the saucepan bottom can be very small even with higher power densities. The electric hotplate does not need to be significantly hotter than the product being cooked, because hitherto in the case of contact heat-transferring hotplates the air gaps formed between the cooking surface of the electric hotplate and the saucepan bottom determined the relatively high temperature difference between the hotplate and the cooking product. However, the temperature differences in the material of the electric hotplate and the saucepan largely determined by heat conduction are almost negligible. As for the indicated, adapted conditions, the temperature difference in the "microgap" possibly forming are very small due to the limited gap size and in the range of a few K, with regards to the heat transfer there is scarcely a difference compared with the ideal contact between both surfaces. As a result heat is very uniformly taken from the electric hotplate and supplied to the cooking vessel. As a result the hotplate no longer has to distribute heat and the saucepan bottom is very uniformly heated, so that there is an avoidance of local temperature differences, which can lead to a non-uniform cooking result over the surface.

Due to the tendency of bodies adapted very well to one another "sticking" due to the "microgap" a system of microventilation ducts can be provided in the cooperating surfaces of the cooking vessel and/or hotplate body. They can run radially and/or circumferentially. The surface portions taken up by them are very small, so that they scarcely impede the overall heat transfer, if the flatness is respected in most of the cooking area.

The preferred hotplate body material is nonoxidic ceramic and in particular silicon nitride ($Si_3N_4$). This can be in disk form. This material has excellent characteristics for the intended use and can also be coloured by additives. In its pure form it has an almost white colour.

In connection with the material selection, as well as the design and dimensioning of the hotplate certain criteria must be respected, which are in part very important for obtaining the desired result. Thus, e.g. the heat transmission coefficient in the hotplate, namely the ratio of the thermal conductivity to the average hotplate body thickness in the cooking area should be smaller than 20,000 $W/m^2K$ and preferably between 6,000 and 12,000 $W/m^2K$. The hotplate material thermal conductivity should also be within a specific range and in particular not too high, namely between 5 and 40 (preferably between 8 and 20) W/mK. Whereas it could be considered that for such contact heat-transferring systems a particularly high thermal conductivity and heat transmission factor would be important, it has been found that the indicated values are particularly advantageous. If the thermal conductivity is too good, the heat is also deflected to the side in the hotplate, which can cause problems on installation, e.g. on bonding the hotplate into a hob plate.

These values, which can particularly well be achieved with silicon carbide, even make it possible for certain purposes to use a continuous cooker plate made from said material and having the indicated characteristics and below which are positioned different, separate heating zones.

The coefficient of thermal expansion of the hotplate material should be between 2 and $6 \times 10^{-6}$ [1/K]. The coefficient of thermal expansion influences the flatness of the plate. Due to the limited temperature differences between the top and bottom of the hotplate body the expansion differences which could lead to a curvature caused by heating are small.

For an energy saving and rapidly regulatable cooking system the stored energy of the hotplate body is important. Relative to the installed capacity of the hotplate it should be between 7 and 130 J/W, preferably between 10 and 50 J/W. Particularly on heating up, only a limited energy quantity is required to bring the plate to a working temperature. However, here again an important part is played by the fact that the hotplate body itself does not have to assume such a high temperature in order to pass on the heat to the cooking product.

The surface load, i.e. the installed capacity per surface unit of the cooking area can be in the range of the hitherto used high performance hotplates and is between 4 and 16 $W/cm^2$ (preferably between 5 and 7 $W/cm^2$).

For the entire cooking system importance is attached to a relatively small average thickness of the hotplate body in the cooking area, which is between 2 and 5 mm and preferably approximately 3 mm. In this respect nonoxidic ceramic and in particular silicon nitride is highly preferred, because the excellent mechanical characteristics ensure that even with such small thicknesses it is possible to respect the requisite characteristics regarding flatness, resistance to scratching, etc. However, it is also possible to use other materials which, due to their characteristics, make it possible to respect the necessary conditions for the flatness. These could be an alloyed steel with a high nickel percentage, e.g. 42% Ni, which in the temperature range between room temperature and 500K has a linear coefficient of thermal expansion below $12 \times 10^{-6}$[1/K], preferably 4 to $5 \times 10^{-6}$ [1/K]. A similar steel with 36% Ni is known under the trade name INVAR.

The hotplate body is to be in the form of a flat disk on its top and bottom and on the bottom divergences therefrom are possible, as will be described hereinafter. The top of the hotplate body should be ground in order to guarantee the necessary flatness. Lapping and polishing of the surface lead to an additional improvement of the thermal conditions. Hardnesses above 14000 (HV 10 according to DIN 50133) are preferred for respecting the necessary resistance to scratching.

Importance is also attached to the electrical characteristics. Thus, a specific electrical resistance of the hotplate body material over $1 \times 10^6$, preferably over $1 \times 10^{13}$ ohm/cm is sought. As a result it is possible to heat the hotplate be heaters fitted directly to the underside of the hotplate body, e.g. thick-film heaters. Such thick-film heaters are produced as films made from a printed on paste. However, thin-film resistors are also possible, e.g. resistance coatings applied by PVD or CVD processes (physical or chemical vacuum deposition).

It is also possible to successfully work with flame spraying processes, which can also operate with plasma. In this way it is possible to spray an intermediate film of a material serving as a primer and/or electrical insulation, e.g. aluminium oxide ($Al_2O_3$). An electrical insulation can be particularly important when using an electrically conductive ceramic, e.g. silicon carbide.

However, other heating modes are also possible, e.g. a pressed or bonded on foil and in all cases the actual heating conductor contour can be produced by cutouts (e.g. by laser machining, erosion, etching or grinding). Preference is given to a production procedure in which the underside of the hotplate body is profiled in accordance with the configuration of the heating resistor paths, so that the areas forming the gaps are raised. The heating resistor material is then applied in whole-surface manner to the underside of the hotplate body and finally grinding thereof takes place in such a way that the material is removed at the raised points.

Particularly suitable heating resistors are those with a PTC characteristic, i.e. with a pronounced positive temperature characteristic of their resistance. Due to the very low mass and scarcely heat transversely conducting properties of the hotplate body it is very advantageous if there can be automatic regulation in zones of the heating. This can be brought about in that the heating resistor is formed by electrically contacted heating resistor films, blocks or plates having PTC characteristics on its top and bottom. The current flows through them perpendicular to the hotplate surface. On reaching the control temperature they reduce their capacity due to the resistance rise and consequently maintain the temperature constant, a setting preferably taking place to the transition temperature of their resistance corresponding to the maximum temperature of the electric hotplate.

Great importance is attached to the regulation and control of such a high performance hotplate. The control preferably takes place by a multicycle circuit, i.e. parallel, individual and/or serial connection of several heating resistor zones and it is preferred to additionally provide a pulse control in a smaller capacity switching area, i.e. a clock control with different relative on periods.

As a result of the circumstances described hereinbefore the control should not be summated over the entire cooking surface and instead individual areas should be selectively involved. It is e.g. possible to have a surface monitoring with NTC characteristic of the temperature limiting sensors, e.g. a sensor film with breakdown characteristics. With a correspondingly rapidly acting control, the actual heating conductor could form one of the contact films of the sensor film.

As a result of the low thermal resistances a measurement of the hotplate temperature enables direct, undelayed conclusions to be drawn concerning the cooking product temperature. Thus a novel cooking process control can be implemented. Thus, e.g. already at the time of heating up, there can be a brief disconnection or reduction of the heating power and then from the characteristic, of the then measured discontinuity in the heating pattern conclusions can be drawn concerning the extent of the coupling and other criteria, be means of which the further cooking process can be regulated or controlled. Such a "control disconnection" can be performed several times as the cooking process proceeds in order to determine the particular state and pattern of the cooking process.

The installation of the hotplate in a hob, a cooker and in particular an associated hob plate preferably takes place in that the hotplate body is inserted in self-supporting manner in a recess of the hob plate, e.g. the opening of a hardened glass or glass ceramic plate or also in a refined or enamelled steel plate. Other materials, e.g. natural and artificial stone plates are suitable. It is also possible to use temperature-resistant plastic or plastic-bound plates, particularly with a high inorganic filler proportion, e.g. a material hitherto used under the trade name SILGRANIT for washbasins (Mssrs. BLANCO, Oberderdingen, Germany)

As it is appropriate for the use of the hotplate to install it in virtually equiplanar manner with the surrounding hob plate and as stresses are to be kept away from the hotplate body, it is advantageous to bond it with a heat-resistant adhesive. However, it should project slightly over the hob plate surface, so as to ensure that a cooking vessel located thereon stands on the cooking surface and not on the hob plate.

The thermal stability of the adhesive is a critical point during bonding in. This is assisted by the relatively small transverse conduction of the hotplate body and its small thickness, which keep temperatures at the marginal adhesion point low. However, it is appropriate to ensure a good heat dissipation towards the hob plate or towards other media located below the same, e.g. a hob or a lower hotplate cover. Thus, in this area is to be formed a thermal bridge, which can also be in the form of a bearing ring for the hotplate body.

Preferably, in the marginal area, the hotplate body has a funnel-shaped chamfer and is located in a correspondingly constructed hob plate opening. If necessary, it can be supported by a bearing ring, which serves to bridge tolerances between the cooperating surfaces of the hob plate and the hotplate body and consequently predetermines the precise position of the planes of hotplate and hob plate for bonding purposes.

Below the heating system can be placed a thermal insulation layer, the latter at all events having a supporting function. However, the hob plate is advantageously self-supporting.

Since, due to its comparatively low surface temperatures and, as opposed to radiant heaters, the non-existent, visible characteristic radiation, the hotplate does not indicate its heating state, it is appropriate to provide special means for this. This could e.g. be in the form of a zone illuminated in operation, e.g. a circumferential ring zone located in the area of the hob plate surrounding the electric hotplate. It could be formed by a recess in the decoration of a hardened glass hob plate and also contain light guide elements, such as a glassy ring. It would also be possible to have a foil printed by thick-film technology having electroluminescent characteristics.

The invention provides a cooking system able to operate with extremely high efficiencies. This is a result of the very good thermal coupling of the cooking vessel and its content with the heating system with limited temperature differences between the same and the fact that such a heating procedure has very low mass and storage. This has a particular effect on the heating up efficiencies, which in the case of conventional, cast iron contact hotplates are 60%, in glass ceramic radiant cooking systems 70% and in induction hot points with their high demands regarding technology and cooking vessels 80%. However, heating up efficiencies of 90% can be achieved with the cooking system according to the invention. Another important advantage are the low maximum temperatures at the hotplate and heating system only a little above the cooking product temperatures. When cooking water-containing foods they are consequently not much over 100° C., whereas when roasting or frying in boiling oil they do not normally exceed 350° C.

These and further features can be gathered from the claims, description and drawings and the individual features, both singly and in random sub-combinations, can be implemented in an embodiment of the invention and in other fields and can represent advantageous, independently protectable constructions for which protection is hereby claimed. The subdivision of the application into individual sections and the subtitles in no way restrict the general nature of the statements made thereunder.

BRIEF DESCRIPTION OF THE DRAWINGS

An embodiment of the invention is described hereinafter relative to the drawings, wherein show:

FIGS. 9 to 17 19 and 20 Different installation alternatives for the hotplate in a hob plate in a vertical detail section.

FIG. 18 A perspective view of a trim ring shown in FIG. 17.

DESCRIPTION OF THE EMBODIMENT

Figure 1:
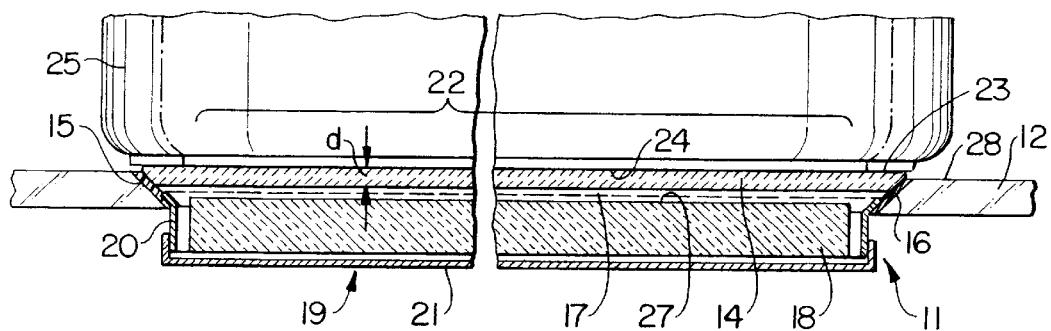
FIG. 1 A diagrammatic side view of an electric hotplate installed in a hob plate.

FIG. 1 shows a cooking system with an electric hotplate 11, whereof one or more are installed in a hob plate 12 of an electric cooker, electric hob, etc., which can in turn be placed in a work plate 13 (FIGS. 21 and 22) of a kitchen furniture item.

An essential component of the electric hotplate is a hotplate body 14. It comprises a usually circular (FIG. 2) disk of nonoxidic ceramic, preferably sintered silicon nitride ($Si_3N_4$). Other materials are possible, provided that they are able to respect the aforementioned and in part also subsequently illustrated mechanical, thermal and electrical characteristics. The plate thickness should be between 2 and 4 mm.

On the outer edge or rim 15 the disk-shaped hotplate body 14 has a conical construction, so as to taper downwards. This conical outer rim 15 matches a corresponding conical opening rim 16 of the hob plate 12. Details of the installation will be given hereinafter relative to FIGS. 9 to 16.

On the underside of the hotplate body is located a heating means 17 in the form of electric resistance heating elements, which will be explained in conjunction with FIGS. 2 to 8. Below it is placed a thermal insulation 18, e.g. of a "pellet" of easily pressed, fumed silica aerogel, which is located in a sheet metal support or carrier tray or shell 19. An explanation thereof will be given in conjunction with FIGS. 15 and 16. In the embodiment of FIG. 1 it is in two parts comprising a circumferential ring 20 and a lower bottom portion 21. The carrier tray 19 only carries the thermal insulation, because the hotplate body 14 is placed in self-supporting manner in the hob plate 12.

The cooking or working area 22 of the hotplate body 14 heated by the heating means 17 extends up to a distance from the outer rim 15 forming a thermal insulation section. In most of this area and preferably over the entire upper cooking surface 23 of the electric hotplate, the hotplate body is extremely flat. Both in the macro-unevenness and in the micro-unevenness, i.e. in the large waves and in the roughness, the surface 23 differs by no more than 0.1 mm, preferably by no more than 0.05 mm from an ideal plane. To this end the hotplate body surface is ground or surface-treated in some other way.

The same requirements apply for the lower surface 24 of a cooking vessel 25 placed thereon, so that the naturally always present microgap 26 between the surfaces 23 and 24 is approximately between 0 mm and max 0.2 mm. However, in particular this flatness condition is not only respected at room temperature, but also in a range between the latter and approximately 500K and preferably even up to 600K, so that this minimum gap thickness exists throughout the working temperature range of the hotplate.

In the case of the hitherto known hotplates and the cooking vessels or saucepans used thereon, these values have been greatly exceeded. In particular the macrodesign of the cooking surface changed in the operating temperature range due to different thermal expansions and namely also as a function of the conditions of the heat supply and removal, i.e. the cooling of the surface. Since, despite an attempt to have planar cooking surfaces in the cold state, this could not be respected and permanently changed in operation, as a result of already existing standards the lower surfaces of the cooking vessels were deliberately made concave, so that at least at the outer edge or rim said gap would become smaller and the cooking vessel could not "seesaw" on the hotplate.

Through maintaining the extreme flatness and adaptation to the associated surface 24 of the cooking vessel, the temperature differences between the heating means 17 in direct thermal contact with the lower surface 27 of the hotplate body and the interior of the cooking vessel and therefore the cooking product are very small. They only represent a few K. This total temperature difference which includes the following transfer or transmission values: heat transfer heating means/hotplate body, heat conduction in the hotplate body, heat transmission through the microgap 26 and thermal conduction in the saucepan bottom, can be below 50K, preferably below 30K and therefore differs by an order of magnitude from the values of the known hotplates. These limited temperature differences also contribute to a permanent maintenance of the conditions causing them, i.e. flatness under all temperature conditions. It would also be possible by a material influencing and/or different material stacking counteracting a thermal stratification to create an "anti-bimetal action" in the hotplate body and/or in the saucepan bottom, in that the hotter surfaces are made with a smaller thermal expansion.

In FIG. 1 the cooking vessel 12 is shown in the normal size relationship, i.e. corresponding to existing recommendations regarding the size of the lower surface 24, it is somewhat larger than the external diameter of the hotplate body. The lower surface of the saucepan bottom consequently projects somewhat over the upper surface 28 of the hob plate. This projection of the cooking surface 23 above the hob plate should be as small as possible, e.g. approximately 0.5 to 1 mm, but this value must certainly be respected, so that there is no inadmissible increase in the size of the microgap 26 by the standing of the saucepan on the hob plate.

Due to the extremely good heat transfer and flatness, it is scarcely necessary for the cooking vessel to project laterally over the cooking surface. It is advantageous for the cooking vessel diameter to be somewhat smaller than the cooking surface (indicated in dot-dash line form in FIG. 1), because consequently the vessel does not form a heat bridge between the heated surface (cooking area 22) and the outer rim 15 of the hotplate body 14.

The hotplate body is preponderantly made from silicon nitride ($Si_3N_4$), but can have different characteristics as a result of desired additives or also undesired impurities. Whereas in pure form the material is light grey to yellowish white, in a less pure form it can have a very dark appearance. Preferably it is coloured by corresponding additives so as to give different colours, e.g. green or red-brown. This increases the attractiveness in any field determined to such an extent by design as kitchens.

The silicon nitride can contain additives giving the plate particular mechanical, thermal, electrical and/or optical characteristics. If the additives are to have a limited optical effect, they can consist individually or of a combination of at least two of the following substances: yttrium oxide and other rare earth oxides, aluminium nitride, aluminium oxide, magnesium oxide, calcium oxide singly or in combination.

Particularly advantageous for the overall image of the hotplate is the possibility of colouring the hotplate body. If a silicon nitride ceramic contains as an additive silicon carbide in a proportion of 2 to 50 wt. %, it is possible to produce grey shades, whereas titanium nitride and/or titanium carbide and/or titanium carbonitride in a proportion of 2 to 30 wt. % gives brown/gold shades, zirconium nitride in a proportion of 1 to 10 wt. % yellow shades and silicide-forming transition metals (e.g. Fe, Cr, Ni, Mo, W, Co) individually or in combination or mixtures in a weight proportion of 0.2 to 20% gives black shades. Combinations of additives can be used for producing intermediate shades (colour gradations). A highly pure silicon nitride is light grey to yellowish white.

The plate is produced by sintering and its bottom surface is ground flat and/or brought to the necessary surface characteristics by other finishing processes such as lapping and the like.

The following technical characteristics must be respected. The thermal conductivity of the hotplate material should be between 5 and 40, preferably between 8 and 20 W/mK. As the microflatness could be modified to the disfavour of the heat transfer by scratching, etc., the hotplate body surface should be scratchproof. The hardness should therefore exceed 1400 (HV 10 according to DIN 50133). In connection with the microflatness, it is pointed out that the values essential for the function relate to average roughness values. However, individual deeper grooves are less prejudicial to the heat transfer than numerous small, deep depressions or even a projecting burr or ridge. It is also important for the hotplate material that it has a lower ductility than metals, because then in the case of a scratch there is no burr formation.

The specific electrical resistance of the hotplate body material should be above $1 \times 10^6$, preferably above approximately $1 \times 10^{13}$ ohm/cm. This value, which apart from the base material is also influenced by admixtures, should be so high that the heating means can be directly applied to the lower surface 27 of the hotplate body 14, without having to interpose an insulating layer. This is also possible e.g. by the flame spraying of aluminium oxide onto the bottom. In the case of a corresponding small film thickness there is only a limited heat transmission reduction. This film can also serve as a primer for the application of the heating means.

The coefficient of thermal expansion of the hotplate material should be between 2 and $6 \times 10^{-6}$ [1/K].

Apart from the purely material characteristics, characteristics also play a significant part which result from the combination of material values and corresponding dimensions and power/capacity values. Importance is attached to the heat transmission coefficient in the hotplate (excluding the heat transfer resistances at both lateral faces of the hotplate body). It is obtained from the ratio of the thermal conductivity (lamda) to the average hotplate body thickness (d) in the cooking area. Here a value below 20,000 $W/m^2K$ is advantageous, so that the heat conduction in the hotplate leading off the heat towards the hotplate rim remains small, whilst through the limited hotplate body thickness the heat transmission is sufficiently high in the main heat flow direction, i.e. between the two surfaces 24 and 27.

When dimensioning the installed capacity of the heating means account must be taken of the following points. The stored energy of the hotplate body should be as low as possible, namely between 7 and 130 J/W, preferably between 10 and 50 J/W. This guarantees rapid heating and good heating up efficiencies whilst respecting the control possibilities. The surface loading, in accordance with standard hotplates, can be between 4 and 16 W/cm$^2$ (5 to 7 W/cm$^2$).

Figure 2:
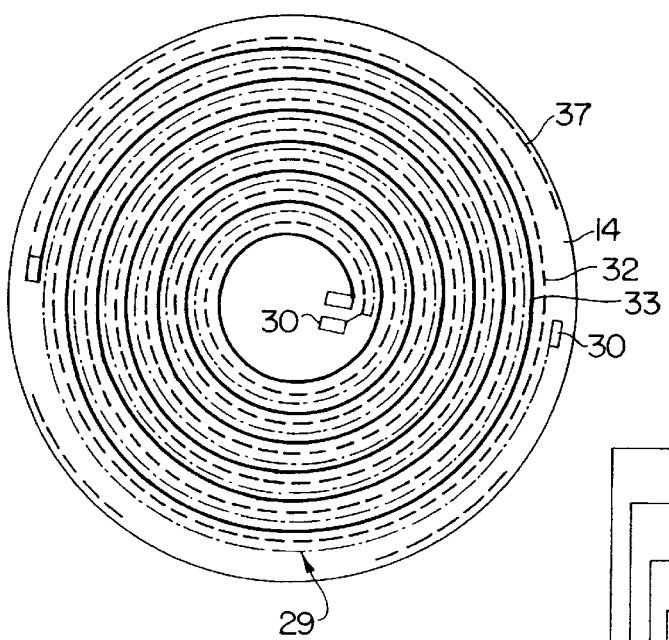
FIG. 2 A diagrammatic view of its heating system and temperature sensors.
Figure 3:
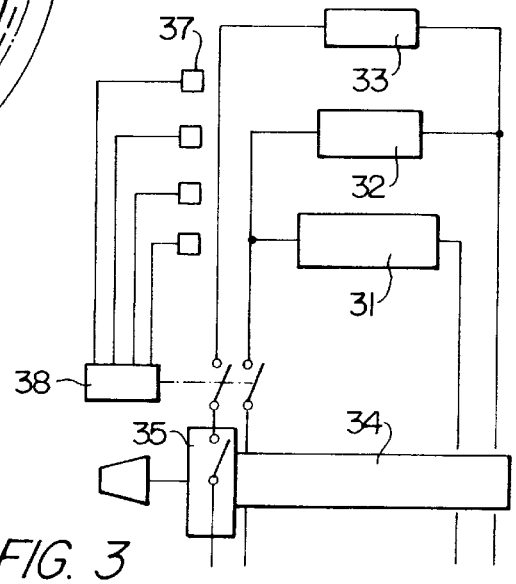
FIG. 3 A diagrammatic circuit diagram.

FIG. 2 is a view from below of the hotplate body 14. It is possible to see multiturn, spirally applied heating conductor paths 29 with connecting surfaces 30 in the form of thin paths and to which can be applied e.g. by mechanical contacting, welding (e.g. by ultrasonics) or soldering connecting wires. The heating conductor paths 31, 32, 33, which in each case are in three parallel paths giving six to seven spiral turns and are so closely juxtaposed, that even on switching on one or a few of these paths a uniform heating is possible. They are applied in the form of thick-film resistors directly to the bottom of the hotplate body, in that the corresponding patterns are printed with a thick-film paste and then hardened by heat treatment of the heating conductors. As a result of the connections or terminals the circuit shown in FIG. 3 is possible, in which the individual heating conductor portions 31, 32, 33 are switchable in a per se known seven-cycle circuit, e.g. with a cam-operated switch 34 or electronically in individual switching combinations, so as to give about six different power stages between a maximum power stage (all three heating conductors in parallel) to a minimum heating stage (all the heating conductors in series) in the different combinations of parallel, single and serial connection. In the bottom power stage (heating conductors 31 to 33 in series) additionally by means of an auxiliary switch 35 a clocking power control device can be switched in, which permits even lower power levels by different relative on periods of the clocking power supply. If use is made of a full-wave pulse packet control, the heating means can comprise a single resistor.

FIG. 1 shows on the rim of the hotplate body temperature sensors 37, which are printed on in the same way by thick-film technology. They monitor the temperature-critical marginal area there as a result of the installation. Like all the temperature monitoring members of the hotplate, they are not to be switched in a summating manner, but instead initiate their monitoring function if a single one of them reaches its disconnection temperature. It is therefore represented in FIG. 3 that the thermal cutouts 37 controlled by them are in each case individually connected thereto and on responding disconnect the entire heating means.

Figure 4:
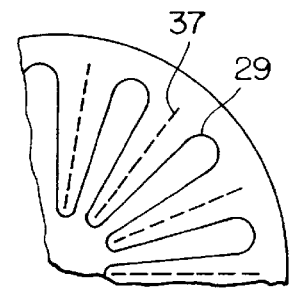
FIG. 4 A detail view form below of another heating and sensor diagram.

FIG. 4 shows a different heating conductor pattern, where the heating conductors 29 are in the form of a round zig-zag line. Sensor paths 37 are placed in the outwardly open areas between the heating conductors 29.

Figure 5:
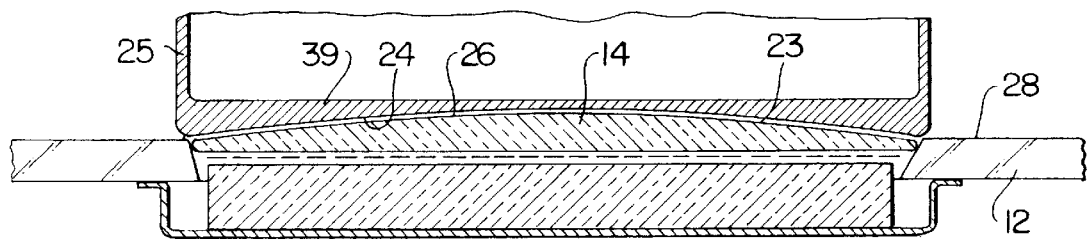
FIG. 5 A diagrammatic (and greatly superelevated) representation of an electric hotplate and a cooking vessel in vertical section.

It has been described in conjunction with FIG. 1 that in the construction shown therein the cooking surface 23 is extremely flat. In greatly super-elevated form, FIG. 5 shows a construction in which the cooking surface 23 of the hotplate body 14 is upwardly curved in the manner of a spherical segment (convex). With such a construction it is necessary to give the same configuration to the lower surface 24 of the saucepan bottom 39, i.e. it is concavely curved in the same way here. Once again the prerequisites for flatness must be respected, i.e. the microgap 26 between the surfaces 23 and 24 should not rise above 0.1 mm in the hotplate temperature operating range. As shown, the hotplate body 14 can be slightly lenticular, so that it maintains its planar bottom, or can be correspondingly curved on its bottom.

In the construction according to FIGS. 1 and 5 the hotplate body bottom can be made from a nonoxidic ceramic. Fundamentally there are no restrictions regarding the material choice, provided that the requisite flatness criteria are satisfied.

Figure 6:
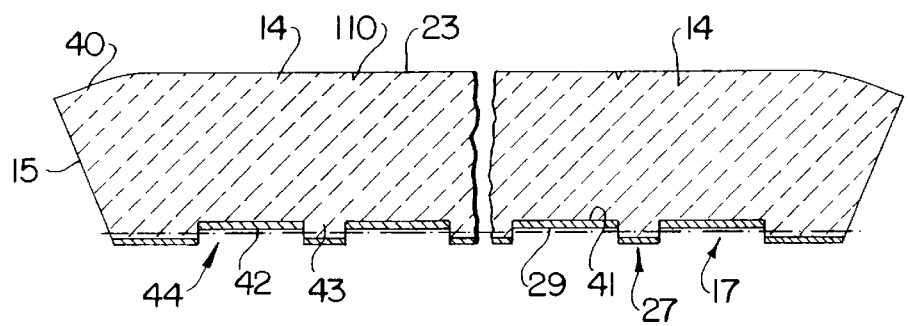
FIG. 6 A greatly enlarged diagrammatic section through a hotplate body with heating system.

FIG. 6 shows in greatly enlarged form a vertical section through a hotplate body 14. As in FIG. 5, the areas adjacent to the rim 15 are provided with a bevel transition, so that in spite of the limited projections over the surface 28 of the hob plate 12, there is a problem-free "sliding" of the saucepan 25 onto and from the cooking surface. Other than the bevel or chamfer 40, the cooking surface top 23 is flat. The bottom is also substantially flat, but has a profile 41 given at the time of manufacture. It contains in depressed form the pattern of the heating installation, e.g. as shown in FIG. 2. Between these depressions 42 are formed downwardly projecting protuberances or webs 43.

For the production of the heating means 17 the underside or bottom is coated in whole-area manner with a heating conductor material. This can e.g. take place by flame or plasma spraying. This permits the application of heating resistor materials in a relatively inexpensive manner and with a considerable material choice rang. It is only difficult in the case of flame spraying to produce laterally sharply defined profiles. In the production procedure of FIG. 7 the coating can take place in a whole-surface manner and as a result of the spraying direction perpendicular to the bottom 27, the horizontal surfaces are coated in preferred manner.

Grinding then takes place over the bottom 27 of the hotplate body 14 to such an extent that the heating conductor material deposited on the webs 43 is removed. All that is left is the heating conductor paths 29 in the depressions 41 and consequently they form the desired heating conductor pattern or profile.

FIG. 6 shows ventilation ducts 110 in the surface 23. They form a system of very narrow ducts, which run radially and circumferentially and ensure that the flat surfaces 23, 24 do not stick to one another due to a suction effect so that the saucepan can scarcely be removed. A ventilation duct system can also be provided in the surface 24, i.e. in the saucepan bottom. The ventilation duct system can also contain holes or openings, which wholly or partly pass through the hotplate body 14 and/or, if this is possible for sealing reasons, the saucepan bottom.

Figure 7:
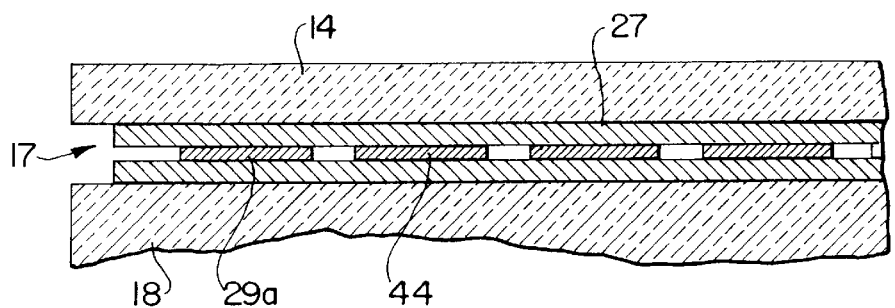
FIG. 7 A section through a hotplate body with its heating system.

FIG. 7 diagrammatically shows the heating means 17 of a hotplate body 14, where said means comprises individual blocks 29a of a heating conductor material with PTC characteristics. Such a material is e.g. barium titanate. The small plates 29a are placed between two contacting foils 44, whereof one is supported on the hotplate body bottom 27 and the other is pressed by the thermal insulation 18. It is also possible to connect said contacting foils in some other way to the hotplate body and/or heating conductor plates 29a, e.g. by heat-resistant and optionally electrically conductive adhesives.

As a result of the positive temperature characteristic of the resistor (PTC) having the plates 29, there is a power-corresponding current flow from one to the other contacting foil 44 only for as long as the typical temperature for the transient characteristic of the selected PTC material to be reached, namely the limiting temperature determined by the PTC material characteristics. At it there is a sudden rise of the electrical resistance. This type of heating has the advantage that without any separate temperature sensors or corresponding limiting measures, any excessive temperatures are avoided and namely in punctiform manner at the points where an overheating would occur. Thus, not only is the hotplate secured against a general overheating, but also against "hot spots", e.g. in the case of a saucepan placed thereon in an accidentally displaced manner.

Figure 8:
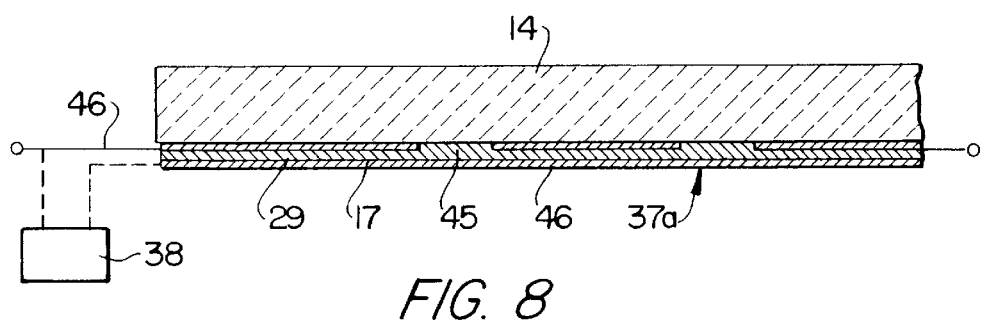
FIG. 8 A corresponding diagrammatic representation of the hotplate body heating system and control.

FIG. 8 shows a construction in which the hotplate body 14 is provided with a heating means 17 applied in a random manner, e.g. using the thick-film method of FIG. 1. A temperature sensor 37a is produced in that the heating conductor paths 29 and the portions located between and separating same are covered with a room temperature-insulating intermediate sensor layer 45, e.g. of a glass melt or a polyimide film (Kapton). These materials have a NTC characteristic, i.e. a suddenly decreasing electrical resistance at a specific temperature and consequently a type of "breakdown characteristic". Below said sensor layer 45 is applied a sensor contact layer 46, e.g. a thin metal layer.

Independently of the electrical power connection 46 of the heating means 17 and in another circuit an optionally high frequency sensor voltage is applied between the heating conductor paths 29 and the sensor contact layer 46. In the case of overheating the resistance of the intermediate sensor layer 45 drops suddenly and as a result of the short-circuit which occurs between the heating conductor path 29 and contact layer 37a a connected thermal cutout 38 can detect overheating and switch off the heating means. However, this must take place very quickly, because otherwise due to several "breakdowns", there could be a short-circuit between the individual heating conductor paths. This requirement does not exist if the two contact layers are electrically separated from the heating means 17.

Figure 9:
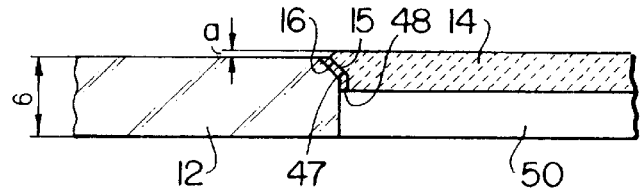

FIG. 9 shows a detail of the installation of the hotplate body 14 in a hob plate 12. It can be seen that between the funnel-shaped opening rim of the hob plate and the correspondingly shaped rim 15 of the hotplate body is placed a heat-resistant adhesive 47, which fixes the hotplate directly in self-supporting manner in the hob plate. The adhesive can be a heat-resistant silicone adhesive, which is normally able to resist temperatures of up to 250° C. (300° C.). A cylindrical portion 48 ensures a good centering. The hob plate 12 can be a hardened glass plate. However, if economically appropriate, glass ceramic plates are also possible. It is also possible to use plates of natural or artificial stone, e.g. granite, or plastic-bound plates provided with inorganic, heat-resistant fillers, such as "Silgranit" of BLANCO, Oberderdingen, whilst refined steel or enamelled steel plates are also possible.

Figure 10:
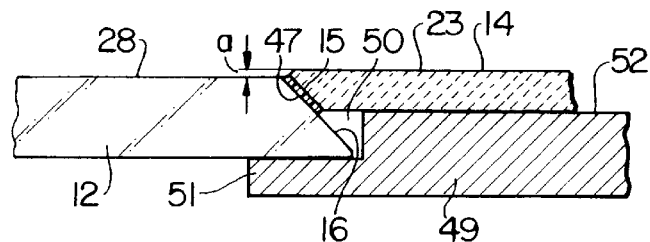

As it is always necessary to have a small spacing a between the cooking surface 23 and the surface 28 of the hob plate 12 and since due to manufacturing tolerances with respect to the rims 15 and 16, aided by the conicity, as well as by different adhesive thicknesses slight tolerances can arise which may prejudice the maintaining of the said spacing a, it is possible according to FIG. 10 to work with a template 49. The latter is inserted in the hob plate opening 50 and engages below the same with a flange 51. The surface 52 of the portion of the template 49 engaging in the opening 50 consequently forms a datum plane independent of the geometry of the rims 15, 16 and on which can be placed the hotplate body 14 whilst being bonded by means of the adhesive 47.

Figure 11:
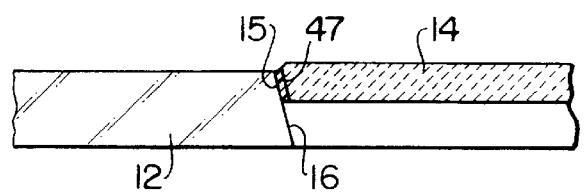
Figure 12:
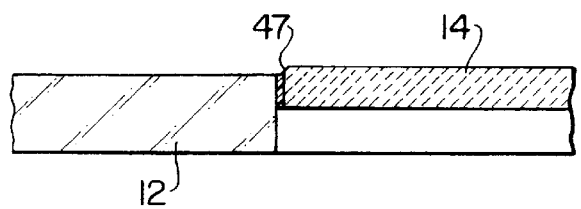

FIGS. 11 and 12 show the installation variants according to FIG. 10 with a smaller conicity of the rims 15, 16 (FIG. 11) or a purely cylindrical arrangement of the adhesive joint (FIG. 12).

Figure 13:
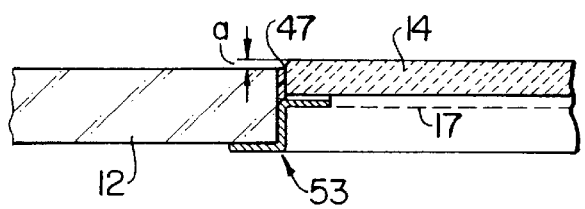

FIG. 13 shows a trim ring 53 in the case of an installation with cylindrical openings or rims corresponding to FIG. 12. The cross-sectionally Z-shaped trim ring takes over the task of the template 49 and consequently ensures the maintaining of the spacing a, but it also has the task of creating a heat bridge in the rim area, so that heat flowing from the heating means 17 to the rim is dissipated via said ring, optionally also to a carrier tray 19, as shown in FIG. 1. The conical insert ring 20 shown could here be replaced by the Z-ring 53. This thermally relieves the temperature-sensitive bonding point 47.

Figure 14:
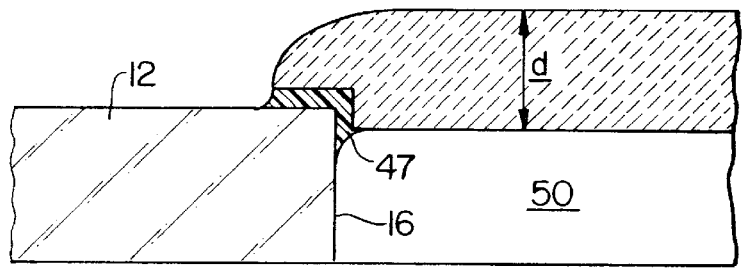

FIG. 14 shows a structure with a relatively high surface-mounted hotplate. On its top it has a curvature 40a in the rim area and on its bottom an angular rim recess, between which and a substantially cylindrical opening 50 of the hob plate is introduced an angular adhesive coating.

Figure 15:
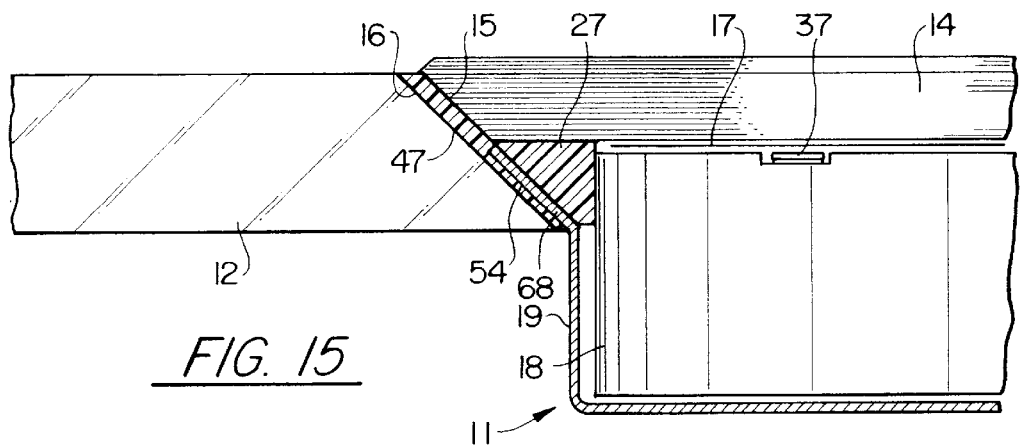

FIG. 15 shows an installation with conical rims 15, 16, in which the carrier tray 19 is made from one piece and has on its upper marginal edge a funnel-shaped enlargement 54, which matches the funnel-shaped rim 16 of the hob plate 12.

Figure 16:
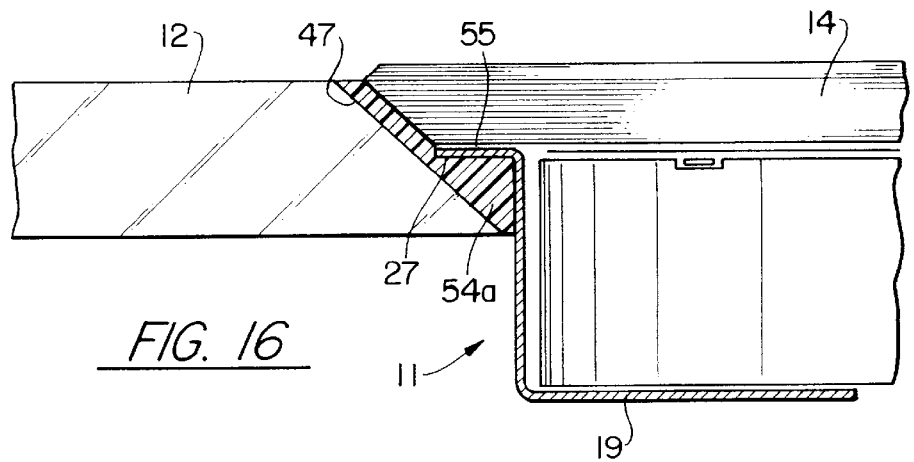

The triangular recess 68 between the rim area of the bottom 27 of the hotplate body and the rim enlargement 54 can be filled at the time of manufacture of the hotplate with a silicone adhesive or some other cement or the like. Thus, the carrier tray 29 is connected to the hotplate body 14 and the intermediately placed or fitted heating means 17, as well as an optionally fitted temperature sensor 37 and the thermal insulation 18 are fixed in their correct reciprocal positions. The resulting "single hotplate" can then be inserted by means of a silicone adhesive layer 47 in the opening 50 of the hob plate 50. Another possibility of creating a "single hotplate", which can be subsequently inserted in a hob plate 12 is shown in FIG. 16. There the hotplate body 14 is connected in the lower marginal area by means of a metal-ceramic connection 55 to a downwardly projecting flange 54a of the carrier tray 19. This also gives a manipulatable hotplate unit, which can again be placed by means of the adhesive layer 47 in the funnel-shaped opening of the hob plate.

In connection with FIGS. 14 to 16 it is pointed out that they permit a bridging of a relatively large, lateral gap between the hob plate and the hotplate body. This may be necessary, because e.g. during the manufacture of the hob plate from hardened glass, the latter must be treated or worked in the unhardened state. During the hardening process a distortion impairing the accuracy to size is unavoidable. To bridge these tolerances, a relatively large spacing bridged by the adhesive 47 must be provided. In the constructions of FIGS. 15 and 16 the corresponding silicone joints are visible, whereas in the construction of FIG. 14 they are covered and no longer have an optically prejudicial effect.

Figure 17:
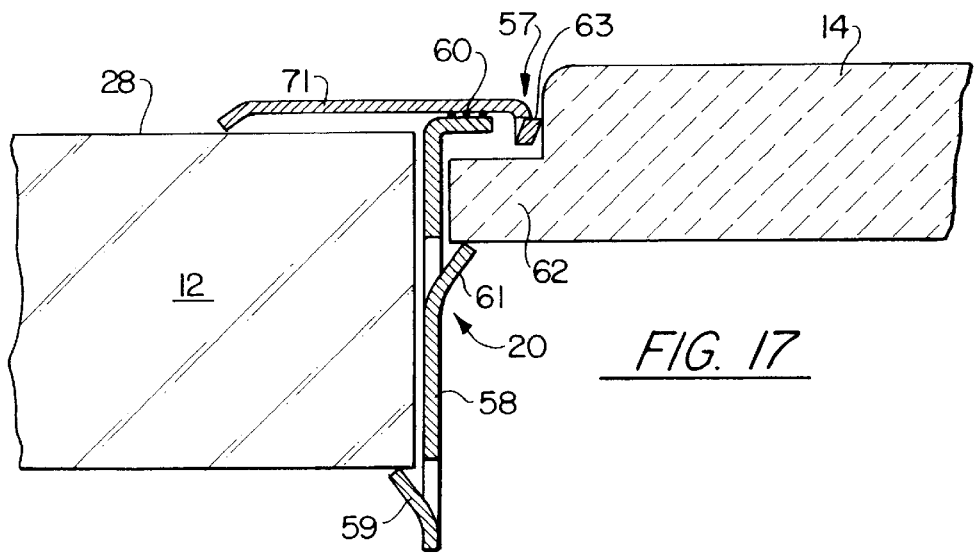

FIGS. 17 and 18 show an adhesive-free installation variant, in which the hotplate body 14 provided with an upper, circumferential marginal recess 57 is carried by a hob ring 20. The latter comprises a substantially cylindrical ring portion 58 (cf. also FIG. 18), which is secured on the one hand on the underside of the hob plate 12 by barb-like holding elements 59 bent out of its surface partly as punched tabs 59 and on the other is supported by means of a bearing ring 71 connected thereto by spot welding 60 on the surface 28 of the hob plate. As is diagrammatically indicated in FIG. 18, out of the ring portion 58 are punched several holding tabs 59 for each of the several circumferentially distributed holding element groups and namely with a very limited difference in the axial height, so that tolerances or deliberate differences in the thickness of the hob plate 12 can be taken into account. From the prepared hob ring are then bent out either only tabs which match the particular hob plate thickness, or for tolerance compensation purposes are bent out all the tabs and only those lock in which come into the locking position from above on pressing in the ring 20.

Apart from the outwardly bent holding elements 59, the holding element 61 produced in the same way are directed inwards and engage beneath the flange 62 forming the marginal recess 57 and press same upwards against a downwardly directed bend of the bearing ring 71. On said bend can also be inwardly bent a barb-like holding element 63 and in the vicinity of the marginal recess 57 can be claw fastened thereto for a rattleproof fixing of the hotplate body 14.

FIG. 19 shows a trim ring 20, which once again with holding elements 59 of the type shown in FIGS. 17 and 18 is secured to the underside of the hob plate 12. The bearing ring 71 is produced in one piece from sheet metal with the ring portion 58. The hotplate body 14 is fixed by stamped pieces 58 provided in the ring portion 58 and which engage in depressions 64, e.g. a ring groove, on the outer circumference of the hotplate body.

The construction of FIG. 20 is provided with a ring 20 corresponding to that of FIG. 19, except for the fact that in place of the stamped piece 65 a top to bottom directed, barb-like holding element 66 engages in the marginal recess 64 of the hotplate body. Thus, in FIGS. 19 and 20 as a result of the elastic characteristics of the sheet metal ring 20, the hotplate body can snap into the ring. This snapping need only be possible for as long as the ring 20 is not inserted in the opening 50 of the hob plate 20, so that the hotplate body 14 when installed in the hob plate is secured against accidental pressing out.

Figure 21:
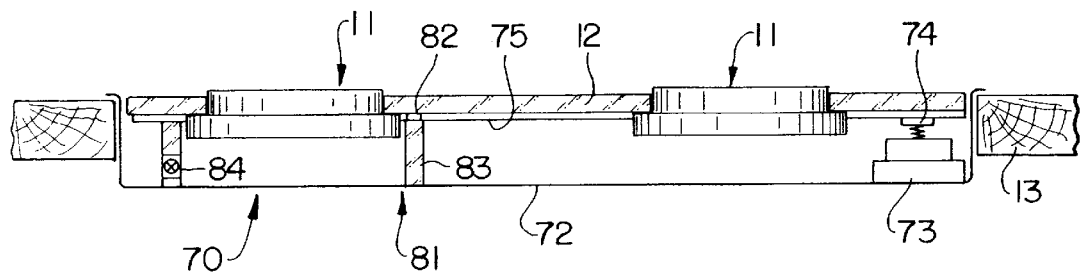
FIGS. 21 & 22 In each case a hob installed in a hob plate and two electric hotplates.

FIG. 21 shows a hob 70, which contains in a flat tray-like sheet metal casing 70 a hob plate 12 with several, usually for electric hotplates 11 installed therein. The hob is installed in a work plate 13, in which is provided controls 73 operating with contact or proximity switches 74 (touch control), which can be operated through the hob plate 12.

Due to the fact that the hob plate is made from a transparent material, e.g. hardened glass or glass ceramic, but unlike in the case of radiant heating systems is only subject to a limited thermal loading, it is possible to produce a decoration 75 on the underside of the hob plate in the form of one or more films, which need not comply with such high thermal requirements and which can also be applied following glass production. Thus, the decoration can be applied by a printing process, e.g. screen process printing to the underside of the hob plate. This offers the possibility of producing the decoration by individual image and/or text processing, e.g. by computer graphics, so that it can adapted to individual customer wishes as regards form and colouring. This can on the one hand be used to permit a selection of different colours or designs from within a particular model series or to process complete, customer-unique designs or to adapt the decoration to the particular kitchen furniture design.

Apart from application by a printing process the decoration can also be contained on the film or foil, which is pressed onto and/or held by the hob plate bottom.

Figure 22:
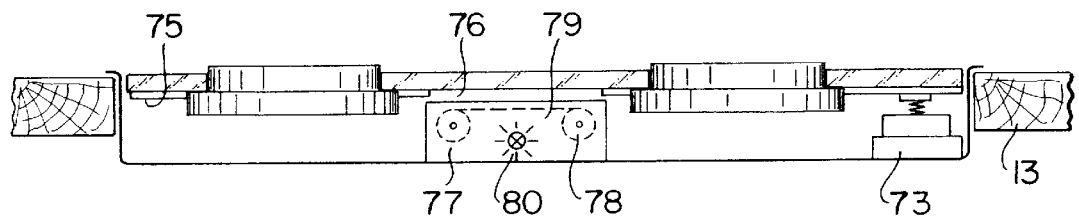

FIG. 22 shows a construction corresponding to that of FIG. 21, but where in the decoration 75 fixed to the hob plate 75 is formed a window 76 below which is located an image or text carrier 77.

Whereas in the construction according to FIG. 21 it is possible within the scope of the individually designed decoration to apply text informations, e.g. in the form of favourite recipes, through the image or text carrier 77 said information can be made interchangeable or indexable. In FIG. 22 is provided a system with two winding rolls 78 for a film 79, which can optionally be illuminated from below by a lamp 80. By manual and/or program-controlled or automatic switching, in each case a specific portion of the film can be brought under the window, so that e.g. by means of an input using the control 73 a particular recipe or a section from a cook book appears in the window.

The image or text carrier can also operate by means of a projection instrument or use other means for rendering it visible, e.g. screens. As in the case of more modern kitchen implements an electronic data processing is integrated into the controls, this could be used for the control of such a display, in that e.g. as a function of a particular cooking program the corresponding recipes are rendered visible or conversely on setting a particular recipe simultaneously the sequence of the cooking program is predetermined or proposed. Even a menu control of the cooking process by means of said display would be possible. Thus, a display or indication possibility is offered which, through the hob plate, can render visible the most varied optical elements, starting from purely decorative elements, passing via accompanying informations to the direct control informations for the active influencing of the cooking process. It would e.g. also be possible to introduce informations concerning the particular cooking state, temperatures, etc.

FIG. 21 shows that in the case of one of the hotplates 7 a state display 81 is provided. It contains in the decoration 75 an annular, transparent or interrupted area 82 surrounding the hotplate 11. Below it is placed a cylindrical glass or glassy ring, such as a plexiglass ring, which forms a light guide 83. It is illuminated in the vicinity of one or more cutouts by lamps 84 and distributes said light over the entire circumference, so that on switching on the lamps 84 from the top of the hob plate it is possible to see a luminous ring around the hotplate. The lamps are switched on when the hotplate is put into operation and disconnection appropriately takes place after the hotplate has cooled. This provides both a state and also a hot display. Through different colours it would also be possible to indicate different temperature or power stages. A zonal illumination, e.g. in the form of several sectors which can be individually connected in, can indicate different states.

It is also possible to work with other forms of light guides or also with direct illumination, e.g. using an annular glow lamp.

A preferred possibility for the control of the power of the electric hotplate has already been illustrated by FIG. 3, where there is a clockwise or cyclic control only in a lower power range. A control of the total energy by clocking is problematical in the invention, because as a result of the very low heat capacity and corresponding rapid response the power pulses must be switched in a very short sequence, which is inadmissible due to the so-called "click rate" both from the mains operator side and due to the electromagnetic compatibility (radio interference). Therefore preference is given to a per se known power control with full-wave pulse packets. In each case individual or several full or half-waves of the alternating current are in each case zeroed and so brought together with corresponding interruptions between them that a symmetrical pulse packet is obtained. Thus, a "packet" consisting e.g. of one or three full-waves, which correspondingly at 50 Hz has a duration of 0.06 seconds, could either have a positive and negative half-wave or in each case two of these, so that a control with the factor 1, $\frac{2}{3}$ and $\frac{1}{3}$ would result without any mains or radio-interfering influences occurring. Normally these pulse packets are much longer and consequently have even greater variation possibilities. They can in turn be clocked, so that further possibilities are obtained. Details on this type of control and the also known electronic means for the implementation thereof are described in DE-A-42 08 252 and the parallel EP-A-561

206 and U.S. Pat. No. 5,488,214, to which express reference is made for disclosure purposes.

Figure 23:
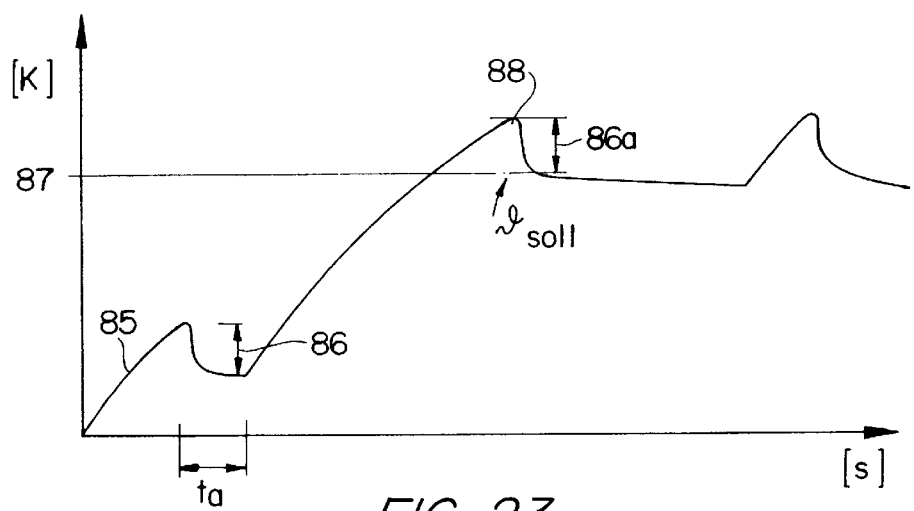
FIG. 23 A diagrammatic representation of the heating pattern at a hotplate in a special regulating or temperature monitoring function.

FIG. 23 shows a possibility of influencing the regulation or control made possible by the fact that the coupling of the cooking product and cooking vessel to the heating means and therefore also to the temperature sensors of the electric hotplate is extremely good in the present invention. FIG. 23 shows a graph of the temperature in Kelvin over the time-in-seconds. During the heating up phase 85 by a brief disconnection of the power over a time $t_a$, it is possible to determine a measure for the coupling quality, which is determined, apart from the values for the hotplate, also by the quality of the saucepan and the heat removal through the cooking product. The value 86 is consequently a temperature drop measured on a sensor contained in the hotplate, optionally also on the heating means itself. It is obtained as a result of the fact that during the relatively short time $t_a$, which must only be a few seconds, the entire hotplate, including the sensor, is cooled to the particular cooking product temperature. If further heating takes place, the disconnection can occur at a temperature higher by the value 86a than the desired temperature 87 to which the cooking product is to be heated. The value 86a is dependent on or equal to the value 86. The dependence can be determined by corresponding tests for different coupling conditions of the specific hotplate, etc.

Also following the disconnection on reaching the desired temperature at the disconnection point 88, the measured temperature again drops to a value largely corresponding to the desired temperature, i.e. the cooking product temperature. On further cooking it is possible to work with the difference value 86a, in that the temperature is only raised until said difference is again reached.

On the basis of these values it is possible to determine a typical power value for the cooking state with which further control can take place. Thus, e.g. on continuing cooking the power supply need be no higher than e.g. 1.1 times the power loss by radiation or convection from the saucepan, etc.

Thus, as a result of the extremely good and rapid access, the invention makes it possible to use the temperature sensor on the electric hotplate for drawing direct conclusions concerning the cooking product temperature.

Figure 24:
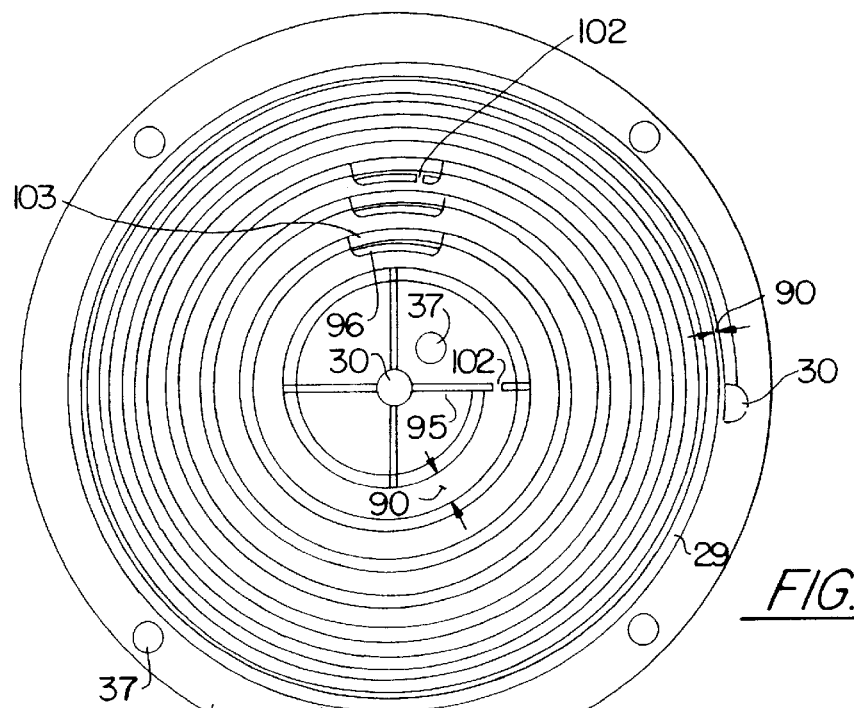
FIGS. 24 to 29 Diagrammatic views of the heating system.

FIG. 24 is a view from below of a hotplate body 14 with its heating means 17, the latter being produced in thick-film technology. The heating conductor paths 29 are printed in the form of a paste containing the corresponding resistance materials and subsequently hardened by a treatment, e.g. a heat treatment. However, other described production methods can be used for the heating conductor paths.

In FIG. 24 there is a continuous heating conductor path 29 from the outer connection 30 to the centrally positioned connection 30. It runs in the form of a spiral, which in the outer area has a relatively limited spacing 90, whereas said spacing increases towards the interior of the spiral. This corresponds to the requirements concerning cooking, where a power concentration in the outer area is desired.

The connection in the centre takes place by means of four spoke-like connecting paths 95 emanating from the centre connection 30 and which contact the inner spiral turn and in part also those connected thereto. In the represented form without a break 102, the inner spiral turn would be short-circuited and therefore out of operation. Through the separation of said connecting paths 95 by means of a laser due to a resistance measurement of the particular heating means it is possible to create five different configurations of the effective conductor path length. An additional possibility for varying the conductor path length and therefore its overall resistance are offered by three compensating bridges 96 provided on the spiral turns and which by short portions 103 short-circuit the conductor path and can also be put out of operation by laser separation. In the embodiment through the breaks 102 only three quarters of the inner spiral turn and two of the portions 103 are put out of operation.

It is consequently possible for certain application methods for heating conductor paths, particularly in the thick-film method, to correct unavoidable divergences in the overall resistance of the heating means 17 in numerous stages. The heating means provided in one conductor path is particularly suitable for the previously described full-wave pulse packet control. Temperature sensors 37 can be circumferentially distributed and located in the centre.

Figure 25:
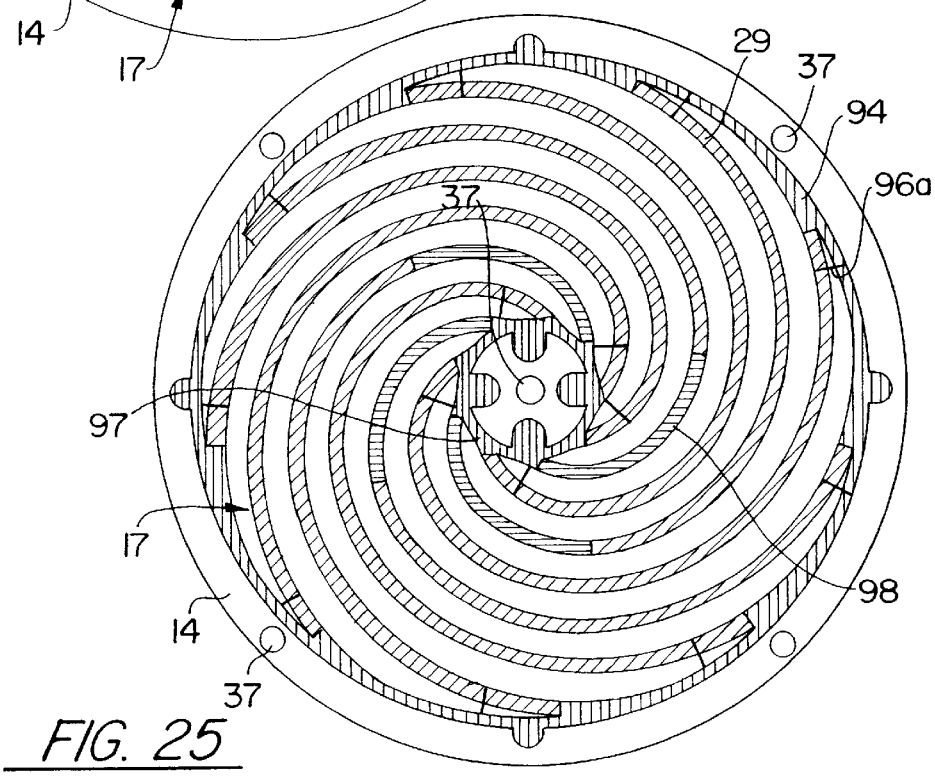

FIG. 25 shows a construction by means of numerous parallel-connected, spiral heating conductor paths 29. They emanate from an outer, circular lead path 94, then passing by somewhat more than half a spiral turn to an inner lead path 97, which surrounds a central sensor 37.

In order to bring about a reduction of the power density in the centre, for certain of the parallel-connected conductor paths short-circuit portions 98 are provided, which shorten the resistance-active conductor path lengths of the corresponding conductor path 29 or limit same to an outer area. These short-circuit portions can be formed by another, more conductive paste or by a correspondingly thicker or multiple application of the resistance paste or printing over the latter a good conducting, e.g. copper-containing paste. In the design of the resistors, it is also possible to vary the resistance activity by varying the width or thickness of the conductor paths.

For compensation purposes balancing or compensating bridges 96a are provided, which are made from the good conducting material of the lead paths 94, 97 and in each case extend from the latter to a heating conductor path portion relatively closely adjacent thereto. As a result of the spiral shape it can be brought about with relatively short bridges, which are then correspondingly separatable in order to influence the resistance of the individual heating conductor path 29.

Figure 26:
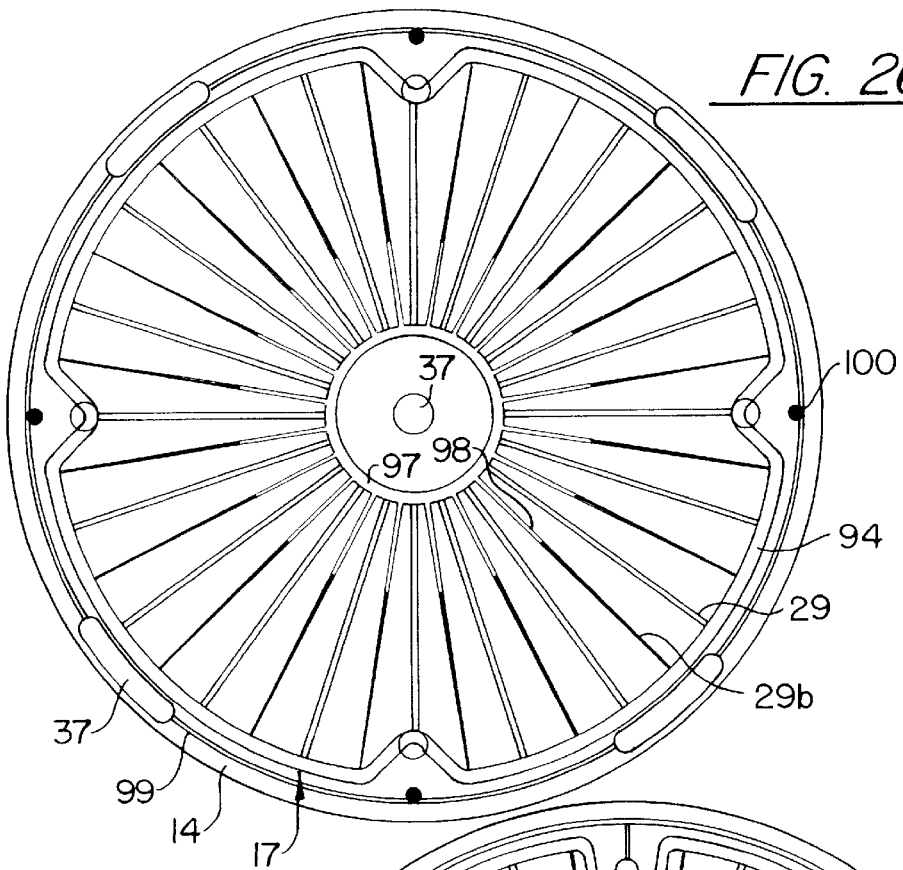

FIG. 26 shows an arrangement of the heating means 17, in which the individual heating conductor paths 29 pass radially from the outer lead path 94 to the inner, substantially circular lead path 97. The individual, radially directed heating conductor paths, whereof e.g. forty are provided, are consequently connected in parallel, which is made possible by a correspondingly high resistance of the individual heating conductor paths. There are two groups of heating conductor paths. Whereas one group is constructed continuously between the lead paths 94, 97, the intermediate heating conductor paths 29b of the other group are limited in their resistance-active path to the outer circumferential portion and are connected on the inside by short-circuit portions 98 to the lead path 97.

The sensors are also positioned centrally, distributed over the outer circumference and connected by sensor connecting paths 99 to sensor connections or terminals 100, which are in each case provided in the vicinity of indentations of the outer lead path 94. It is consequently possible to individually connect each sensor 37 and individually evaluate its signal. The sensor connecting paths can also be constructed as printed conductor paths.

Figure 27:
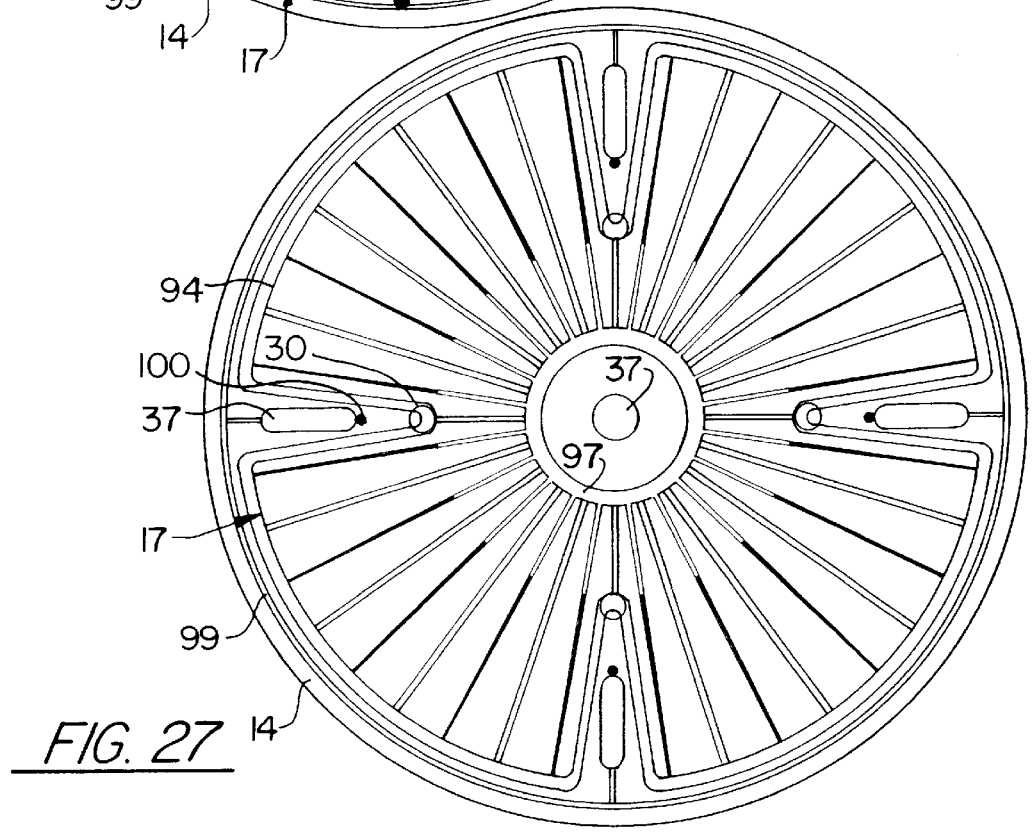

FIG. 27 shows a construction corresponding to that of FIG. 26. However, the sensors 37 are provided in the vicinity of the indentations 101 of the lead path 94 and in said area are also connected to the terminals 100. The sensor connecting path 29 passes round and forms the outer connecting pole of the sensors.

Figure 28:
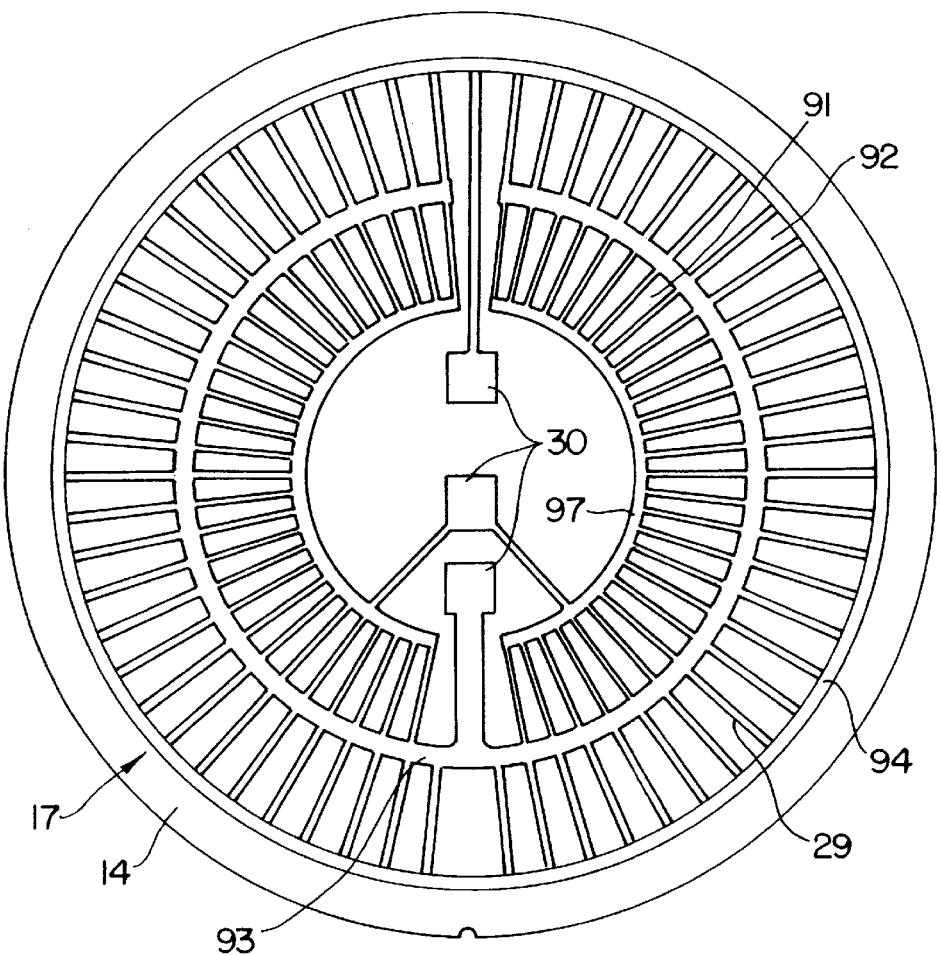

FIG. 28 shows a two-circuit hotplate design. As in FIGS. 26 and 27, the heating conductor paths 29 are arranged radially, but between the outer and inner lead paths 94, 97 there is a central, substantially circular lead strand 93, also in the form of a printed conductor path. These three lead paths 93, 94, 97 are individually connectable by means of their terminals 30, so that it is possible to separately operate the resulting two concentric heating zones 91, 92. It is consequently possible to only connect in the central main heating zone 91 in order to heat a smaller cooking vessel, or to operate it together with the outer zone 92, in order to heat the full size of the electric hotplate and correspondingly heat a larger cooking vessel. The hotplate according to the present invention is particularly suitable for this purpose because, due to the limited transverse heat conduction in the hotplate body 14, the heating zones remain clearly defined without any separate compartmentalization, so that in the vicinity of the lead strand 93 there is a thermal boundary between the two heating zones.

Figure 29:
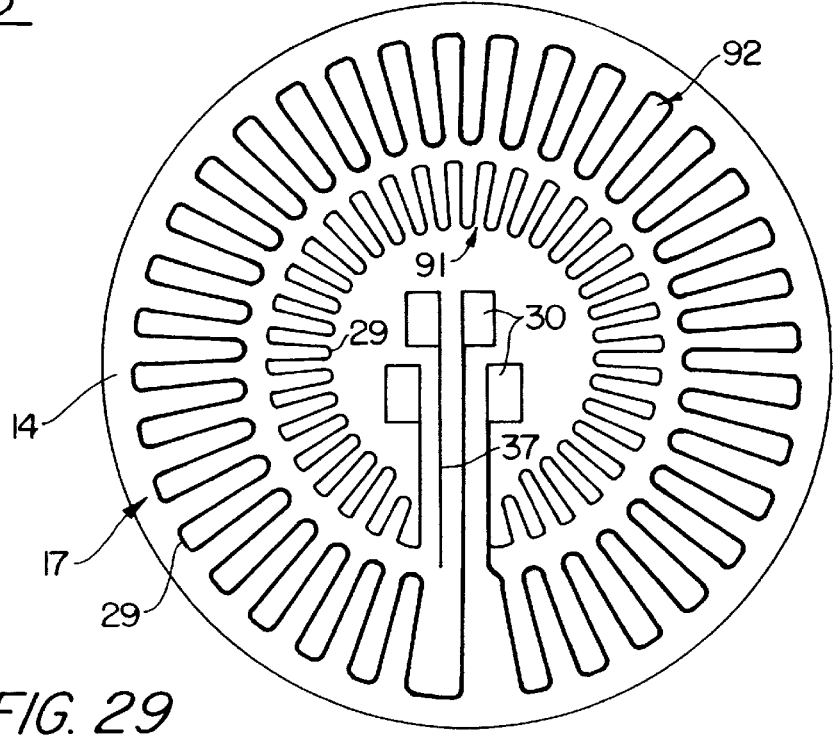

FIG. 29 also shows a two-circuit design, in which the heating conductor paths 29 are in the form of circular meanders in the two heating zones 91, 92 and pass from there to the central terminals 30. A further connection or terminal is provided for an in this case strip-like sensor 37 (cf. also FIG. 4).

Figure 30:
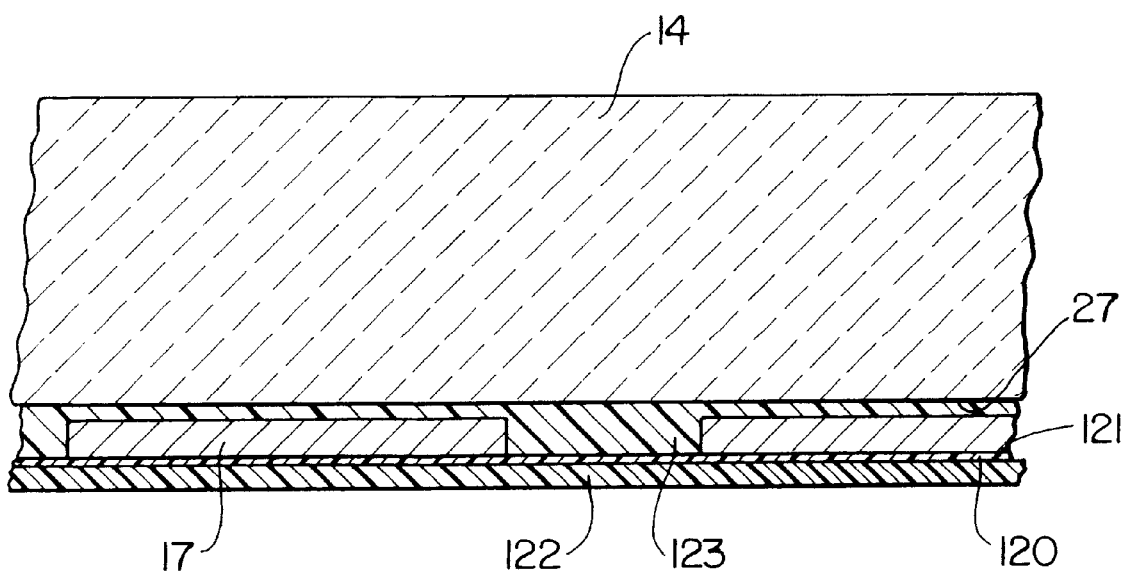
FIG. 30 A greatly enlarged detail of the hotplate body and its heating system.

FIG. 30 shows a greatly enlarged detail of the hotplate body with the heating means fitted thereto and in the vicinity of the heating means and its fastening the thickness ratios are greatly increased in order to make the representation more readily comprehensible. The heating means 17 comprises a thin strip of electric resistance material, e.g. a flat strip or foil brought into a corresponding contour in the manner described hereinbefore. It is bonded by means of its back 120 remote from the hotplate body 14 by means of a thin adhesive coating 121, to an insulating film 122, e.g. a polyimide film, as known under the trade name Kapton. The adhesive coating can be a heat-resistant coating. However, it is also possible to fit the heater to the film in some other way. It could e.g. be evaporation coated or sprayed onto the film.

The correspondingly prepared back 27 of the hotplate body is then covered e.g. by spraying with a liquid adhesive coating 123. Here again it is a heat-resistant adhesive, which is preferably good heat conducting. This can e.g. take place by incorporating metal particles. This adhesive forms a thin coating scarcely impeding the heat transfer to the hotplate and located between the heating means and hotplate body 14, so as to fill in insulating manner the gaps between the heating resistors. In connection with the adhesive it must be ensured that although it transfers heat, it is also electrically insulating.

Following complete hardening the heating means is firmly connected to the hotplate body and is well protected beneath the adhesive coating and film covering. As a result any cracks which could arise during the operation of the ceramic hotplate in the direct heating conductor area in the bond between the conductor path and the ceramic plate due to the temperature changes cannot have a disturbing influence. As the thicker heat conducting adhesive coating is not exposed to any or only slight heat changes in the gaps of the heating resistors 17, these zones are formed in crack-free manner and acquire the "pressing force" of the heating means and consequently very narrow gap dimensions in the conductor path area.

The fitting of the heating means by adhesive coatings is made possible by the good heat transfer between the hotplate and the cooking vessels, which keeps the temperatures at the heating means low.

What is claimed is:

1. Cooking system having an electric hotplate, said system transferring heat by contact to at least one cooking vessel, said system comprising:
    at least one heating resistor applied to a substantially disk-shaped hotplate body having a cooking surface defining a cooking area;
    wherein the hotplate body is comprised of nonoxidic ceramic and is placed in a recess of a hob plate; and
    wherein the surface has macro-unevennesses, defined as divergence from a geometrically ideal plane, and micro-unevennesses, defined as roughness of the surface, both unevennesses not exceeding 0.1 mm in most of the cooking area in a working temperature range between approximately room temperature and 500 K in most of the cooking area.

2. Cooking system according to claim 1, wherein both unevennesses do not exceed 0.05 mm.

3. Cooking system according to claim 2, wherein the associated surfaces of electric hotplate and cooking vessel in the working temperature range form identical spherical or spherical segmental surfaces.

4. Cooking system according to claim 1, wherein both unevennesses are below 0.1 mm over virtually the entire cooking surface.

5. Cooking system according to claim 1, wherein both unevennesses are below 0.1 mm in a working temperature range between approximately room temperature and 600 K.

6. Cooking system according to claim 5, wherein the temperature range, in which the unevennesses are below 0.05 mm, extends up to 600 K.

7. Cooking system according to claim 1, wherein the ceramic contains at least 50% silicon nitride.

8. Cooking system according to claim 1, wherein the ceramic contains at least one additive from the group consisting of yttrium oxide, rare earth oxides, aluminum nitride, aluminum oxide, magnesium oxide, and calcium oxide, and wherein the at least one additive has a limited optical effect.

9. Cooking system according to claim 8, wherein the silicon nitride ceramic contains as an additive one out of the following list: silicon carbide in a proportion of 2 to 50 wt. % in order to produce grey shades;
    titanium nitride, titanium carbide, titanium carbon-nitride in a proportion of 2 to 30 wt. % each in order to produce brown/gold shades;
    zirconium nitride in a proportion of 1 to 10 wt. % to produce yellow shades;
    silicide-forming transition metals like Fe, Cr, Ni, Mo, W, Co compounds and mixtures thereof in a proportion of 0.2 to 20 wt. % in order to produce black shades.

10. Cooking system according to claim 9, wherein combinations of the additives for producing color gradations are used.

11. Cooking system according to claim 1, wherein the heat transmission coefficient in the hotplate, defined as the ratio of thermal conductivity to the average hotplate body thickness in the cooking area, is smaller than approximately 20,000 W/m$^2$K.

12. Cooking system according to claim 11, wherein the heat transmission coefficient is between approximately 6,000 and 12,000 W/m$^2$K.

13. Cooking system according to claim 1, wherein the thermal conductivity of the hotplate body material is between approximately 5 and 40 W/mK.

14. Cooking system according to claim 13, wherein the thermal conductivity in between 8 and 20 W/mK.

15. Cooking system according to claim 1, wherein the coefficient efficient of thermal expansion (alpha) of the hotplate body material is lower than $12 \times 10^{-6}$.

16. Cooking system according to claim 15, wherein the coefficient is between 2 and $10^{-6}$ and $6 \times 10^{-6}$.

17. Cooking system according to claim 1, wherein the hotplate body stores between 7 and 130 J/W of energy based on its installed capacity.

18. Cooking system according to claim 17, wherein the stored energy is between 10 and 50 J/W.

19. Cooking system according to claim 1, wherein the surface loading, defined as the installed capacity of the electric hotplate per surface unit of the cooking area, is between 4 and 16 W/cm$^2$.

20. Cooking system according to claim 19, wherein the surface loading ist between 5 and 7 W/cm$^2$.

21. Cooking system according to claim 1, wherein the average thickness of the hotplate body in the cooking area is between approximately 2 and 5 mm.

22. Cooking system according to claim 21, wherein the average thickness is about 3 mm.

23. Cooking system according to claim 1, wherein the cooking surface of the hotplate body is machined by grinding at least in the cooking area.

24. Cooking system according to claim 1, wherein the cooking surface of the hotplate body in the cooking area has a hardness of more than 1400 measured in HV 10 according to German Industrial Standards DIN 50133.

25. Cooking system according to claim 1, wherein a specific electrical resistance of the material of the hotplate body is above $1 \times 10^6$ ohm/cm.

26. Cooking system according to claim 25, wherein the specific electrical resistance is avove $1 \times 10^{13}$ ohm/cm.

27. Cooking system according to claim 1, wherein the hotplate body is heated by a heating resistor applied to its bottom in the form of conductor paths with a reduced power density towards the center at the hotplate body.

28. Cooking system according to claim 27, wherein the heating resistor is a think-film heating resistor formed by a printed-on paste.

29. Cooking system according to claim 27, wherein the heating resistor is applied by spraying.

30. Cooking system according to claim 1, wherein a multi-circuit hotplate is formed by different heating zones with a central, constantly energizable main heating zone and an outer heating zone which can be energized together with the outer heating zone.

31. Cooking system according to claim 1, wherein between the hotplate body and heating resistor is applied an electrical insulating film having priming properties.

32. Cooking system according to claim 1, wherein the heating resistor is a thin-film heating resistor.

33. Cooking system according to claim 1, wherein conductor paths of the heating resistor are separated from one another by gaps produced by one of the group consisting of laser machining, etching, eroding and grinding.

34. Cooking system according to claim 1, wherein the heating resistor has PTC characteristics.

35. Cooking system according to claim 1, wherein the heating resistor comprises a film applied to a bottom of the hotplate body and being applied by means of an adhesive coating by its back remote from the hotplate body to an insulating film, whilst its front is bonded with a heat conducting adhesive coating filling the gaps between heating resistors to the bottom of the hotplate body.

36. Cooking system according to claim 1, wherein:
the hotplate body has an underside; and,
the heating resistor is formed by at least one heating resistor film having a top and a bottom, covering at least parts of the underside of the hotplate body and being electrically contacted at the top and bottom and having PTC characteristics.

37. Cooking system according to claim 36, wherein the heating resistor comprise two electrically conductive films running parallel to a bottom of the hotplate body and preferably pressed there to, the heating resistor film being placed between the conductive films.

38. Cooking system according to claim 1, wherein thermal limiting sensors are provided with a response behavior acting in a distributed manner over the cooking area and which are non-summating.

39. Cooking system according to claim 1, wherein surface monitoring means with NTC characteristics are provided by thermal limiting sensors containing a sensor coating with temperature-dependent breakdown characteristics.

40. Cooking system according to claim 39, wherein the sensor coating is located between two contact coatings in parallel and in directly thermally contacting manner on the heating resistor.

41. Cooking system according to claim 1, further comprising control means for full-wave pulse packet control of the hotplate.

42. Cooking system according to claim 1, wherein the hotplate body 14) is placed in a self-supporting manner in the recess of the hob plate, which is made from a group of materials including hardened glass, glass ceramic, refined steel, natural and synthetic stone.

43. Cooking system according to claim 42, wherein the hotplate body is bonded to the hob plate at a bonding area, a hotplate body thermal insulation zone being provide between the bonding area and the cooking area.

44. Cooking system according to claim 42, wherein the cooking surface of the cooking plate body is almost equiplanar with the surface of the hob plate.

45. Cooking system according to claim 42, wherein the hotplate body is bonded into a recess of the hob plate, the outer rim of the hotplate body and the inner rim of the recess being conically adapted to one another.

46. Cooking system according to claim 42, wherein the hotplate body is bonded to the hob at a bonding area, a heat bridge being provided in the vicinity of the bonding area between the hotplate body and a hob plate.

47. Cooking system according to claim 42, wherein a bearing element is provided in the recess of the hob plate for limiting penetration depth of the hotplate body.

48. Cooking system according to claim 42, wherein a holding ring for a lower cover of the electric hotplate is inserted in the recess.

49. Cooking system according to claim 42, wherein a trim ring for installation of the electric hotplate in the hob plate with barb-like holding elements is provided.

50. Cooking system according to claim 1, wherein a thermal insulation is placed below the heating means.

51. Cooking system according to claim 1, wherein a zone is provided in an area surrounding the electric hotplate, said zone being illuminated during the operation of the hotplate.

52. Cooking system according to claim 1, wherein a ventilation duct system is provided in the surface of the hotplate body.

53. Cooking system according to claim 1, wherein the hotplate body is substantially disk-shaped and comprised of a nonoxidic ceramic having at least 50% silicon nitride.

54. Cooking system according to claim 1, wherein the ceramic consists essentially of silicon nitride.

55. Cooking system having an electric hotplate, said system transferring heat by contact to at least one cooking vessel, said system comprising:
- at least one heating resistor applied to a hotplate body having a cooking surface defining a cooking area;
- wherein the surface has macro-unevennesses, defined as divergence from a geometrically ideal plane, and micro-unevennesses, defined as roughness of the surface, both unevennesses not exceeding 0.1 mm in most of the cooking area in a working temperature range between approximately room temperature and 500 K; and
- wherein the bottom of the hotplate body is profiled in accordance with a pattern of heating conductor paths, the pattern consisting of raised and recessed areas, both areas being covered by heating resistor material, the heating resistor material in the raised areas being removed to form the conductor path, leaving the heating resistor material in the recessed areas to form gaps between the conductor paths.

56. Cooking system having an electric hotplate, said system transferring heat by contact to at least one cooking vessel, said system comprising:
- at least one heating resistor applied to a hotplate body having a cooking surface defining a cooking area;
- wherein the surface has macro-unevennesses, defined as divergence from a geometrically ideal plane, and micro-unevennesses, defined as roughness of the surface, both unevennesses not exceeding 0.1 mm in most of the cooking area in a working temperature range between approximately room temperature and 500 K; and
- wherein the control means of the electric hotplate involves a temperature measurement means at said hotplate measuring temperature during a brief reduction of heating power and controlling cooking process by means of the temperature difference measured before and after the reduction.

57. Cooking system, containing at least one electric hotplate with a hotplate body and at least one cooking vessel, the hotplate body being substantially disk-shaped, comprised of nonoxidic ceramic, and placed in a recess of a hob plate;
- wherein the hotplate has a cooking surface transferring heat by contact to a vessel surface of the cooking vessel; and
- wherein the electric hotplate and the cooking vessel are adapted to one another so that their associated surfaces, with respect to their spacings defined as divergences from one another, do not exceed 0.1 mm in most of the cooking area, in a temperature range between approximately room temperature and 500 K.

58. Cooking system according to claim 57, wherein the electric hotplate and the cooking vessel are adapted to one another so that their associated surfaces, with respect to their spacings defined as divergences from one another, do not exceed 0.05 mm in most of the cooking area, in a temperature range between approximately room temperature and 500 K.

59. Cooking system according to claim 57, wherein the electric hotplate and the cooking vessel are adapted to one another so that their associated surfaces, with respect to their spacings defined as divergences from one another, do not exceed 0.05 mm in most of the cooking area, in a temperature range between approximately room temperature and 500 K.

60. Cooking system according to claim 57, wherein the electric hotplate and the cooking vessel are adapted to one another so that their associated surfaces, with respect to their spacings defined as divergences from one another, do not exceed 0.05 mm in most of the cooking area, in a temperature range between approximately room temperature and 600 K.

61. Cooking system according to claim 57, wherein the electric hotplate and the cooking vessel are adapted to one another so that their associated surfaces, with respect to their spacings defined as divergences from one another, do not exceed 0.1 mm in most of the cooking area, in a temperature range between approximately room temperature and 600 K.

62. Cooking system having an electric hotplate, said system transferring heat by contact to at least one cooking vessel, said system comprising:
- at least one heating resistor applied to a hotplate body directly in form of a layer of resistive material bonded to the bottom of the hotplate body;
- wherein the hotplate body is substantially disk-shaped, comprised of a nonoxidic ceramic, and has a cooking surface defining a cooking area; and
- wherein the surface has macro-unevennesses, defined as divergence from a geometrically ideal plane, and micro-unevennesses, defined as roughness of the surface, both unevennesses not exceeding 0.1 mm in most of the cooking area, in a working temperature range between approximately room temperature and 500 K.

63. Cooking system having an electric hotplate, said system transferring heat by contact to at least one cooking vessel, said system comprising:
- at least one heating resistor applied to a hotplate body directly in form of a layer of resistive material bonded to the bottom of the hotplate body;
- wherein the hotplate body is substantially disk-shaped, has a thickness of approximately 3 mm, is comprised of a nonoxidic ceramic, is substantially flat on its bottom at least with respect to its macro design and flat on its top, and has a cooking surface at its top defining a cooking area; and
- wherein the surface has macro-unevennesses, defined as divergence from a geometrically ideal plane, and micro-unevennesses, defined as roughness of the surface, both unevennesses not exceeding 0.1 mm in most of the cooking area in a working temperature range between approximately room temperature and 500 K.

64. Cooking system having an electric hotplate, said system transferring heat by contact to at least one cooking vessel, said system comprising:
- at least one heating resistor applied to a hotplate body directly in the form of a layer of resistive material bonded to the bottom of the hotplate body;
- wherein the hotplate body is substantially disk-shaped, has a thickness of approximately 3 mm, is comprised of a nonoxidic ceramic, is substantially flat on its bottom at least with respect to its macro design and flat on its top, and has a cooking surface at its top defining a cooking area; and
- wherein the surface has macro-unevennesses, defined as divergence from a geometrically ideal plane, and micro-unevennesses, defined as roughness of the surface, both unevennesses do not exceed 0.1 mm in most of the cooking area in a working temperature range between approximately room temperature and 500 K.

\* \* \* \* \*